United States Patent
Kim et al.

(10) Patent No.: US 11,431,460 B2
(45) Date of Patent: Aug. 30, 2022

(54) METHOD AND APPARATUS FOR TRANSMITTING AND RECEIVING CONTROL INFORMATION AND DATA IN FRAME STRUCTURE OF SHORT TRANSMISSION TIME INTERVAL

(71) Applicant: KT CORPORATION, Gyeonggi-do (KR)

(72) Inventors: Ki-tae Kim, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 271 days.

(21) Appl. No.: 16/098,812

(22) PCT Filed: May 2, 2017

(86) PCT No.: PCT/KR2017/004702
§ 371 (c)(1),
(2) Date: Nov. 2, 2018

(87) PCT Pub. No.: WO2017/192014
PCT Pub. Date: Nov. 9, 2017

(65) Prior Publication Data
US 2019/0140803 A1    May 9, 2019

(30) Foreign Application Priority Data

May 4, 2016  (KR) .................. 10-2016-0055676
May 12, 2016 (KR) .................. 10-2016-0058317
(Continued)

(51) Int. Cl.
*H04L 5/00*   (2006.01)
*H04W 72/04*  (2009.01)
(Continued)

(52) U.S. Cl.
CPC ........ *H04L 5/0055* (2013.01); *H04J 11/0086* (2013.01); *H04L 5/0053* (2013.01);
(Continued)

(58) Field of Classification Search
None
See application file for complete search history.

(56) References Cited

U.S. PATENT DOCUMENTS

2014/0064214 A1   3/2014   Papasakellariou et al.
2016/0014735 A1   1/2016   Papasakellariou et al.
(Continued)

FOREIGN PATENT DOCUMENTS

KR   10-2014-0031120 A   3/2014
WO      2015/140601 A1   9/2015

OTHER PUBLICATIONS

Ericsson, "Physical layer aspects for PUSCH for short TTI", R1-163320, 3GPP TSG RAN WG1 Meeting #84 bis, Busan, Apr. 11-15, 2016, pp. 1-3.
(Continued)

*Primary Examiner* — James P Duffy
(74) *Attorney, Agent, or Firm* — Invenstone Patent, LLC

(57) ABSTRACT

Provided are a method for transmitting and receiving control information and data between a user equipment and a base station in a short TTI frame structure. In the method, a search space of a legacy PDCCH and a search space of a sPDCCH may be separated from each other on the basis of the type of the search space or aggregation level, etc., and information on the separated search space may be signaled to the user equipment, thereby enabling the user equipment to detect a DCI while reducing the complexity of a blind decoding.

6 Claims, 19 Drawing Sheets

(30) Foreign Application Priority Data

May 2, 2017 (KR) .......................... 10-2017-0056011
May 2, 2017 (KR) .......................... 10-2017-0056206

(51) Int. Cl.
| | | |
|---|---|---|
| *H04J 11/00* | (2006.01) | |
| *H04W 48/12* | (2009.01) | |
| *H04W 72/14* | (2009.01) | |
| *H04L 1/18* | (2006.01) | |

(52) U.S. Cl.
CPC ....... *H04W 48/12* (2013.01); *H04W 72/0446* (2013.01); *H04L 1/1812* (2013.01); *H04L 5/001* (2013.01); *H04L 5/0035* (2013.01); *H04L 5/0048* (2013.01); *H04L 5/0051* (2013.01); *H04W 72/042* (2013.01); *H04W 72/14* (2013.01)

(56) References Cited

U.S. PATENT DOCUMENTS

| | | | |
|---|---|---|---|
| 2016/0014736 A1 | 1/2016 | Papasakellariou et al. | |
| 2016/0014737 A1 | 1/2016 | Papasakellariou et al. | |
| 2016/0014738 A1 | 1/2016 | Papasakellariou et al. | |
| 2016/0014739 A1 | 1/2016 | Papasakellariou et al. | |
| 2016/0095137 A1* | 3/2016 | Chen ................... | H04L 25/0224 370/329 |
| 2017/0070979 A1 | 3/2017 | Mirzaee et al. | |
| 2018/0359745 A1* | 12/2018 | Yeo ....................... | H04L 5/0048 |
| 2018/0375636 A1 | 12/2018 | You et al. | |

OTHER PUBLICATIONS

Huawei et al., "DCI design for short TTI", R1-162588, 3GPP TSG RAN WG1 Meeting #84bis, Busan, Korea Apr. 11-15, 2016, pp. 1-11.

ZTE, "Downlink control channels for shortened TTI", R1-162405, 3GPP TSG RAN WG1 Meeting #84bis, Busan, Korea Apr. 11-15, 2016, pp. 1-7.

Lenovo, "Design of DL channels for shortened TTI", R1-162738, 3GPP TSG RAN WG1 Meeting #84b, Busan, Korea, Apr. 11-15, 2016, pp. 1-5.

Ericsson et al., "New SI proposal: Study on Latency reduction techniques for LTE", RP-150465, 3GPP TSG RAN Meeting #67, Shanghai, China, Mar. 9-12, 2015, pp. 1-8.

3GPP TR 36.881 V0.4.0, "3rd Generation Partnership Project; Technical Specification Group Radio Access Network Evolved Universal Terrestrial Radio Access (E-UTRA); Study on latency reduction techniques for LTE (Release 13)", R2-155008, Oct. 2015, pp. 1-59.

3GPP TR 36.881 V0.5.0, R1-160927, pp. 1-87.

Huawei et al., "Control signaling enhancements for short TTI", R1-156461, 3GPP TSG RAN WG1 Meeting #83, Anaheim, USA, Nov. 15-22, 2015, pp. 1-6.

3GPP TS 36.213 V10.0.0, "3rd Generation Partnership Project; Technical Specification Group Radio Access Network; Evolved Universal Terrestrial Radio Access (E-UTRA); Physical layer procedures (Release 10)", Dec. 2010, pp. 1-101.

3GPP TS 36.211 V10.0.0, "3rd Generation Partnership Project; Technical Specification Group Radio Access Network; Evolved Universal Terrestrial Radio Access (E-UTRA); Physical channels and modulation (Release 10)", Dec. 2010, pp. 1-110.

\* cited by examiner

FIG.2
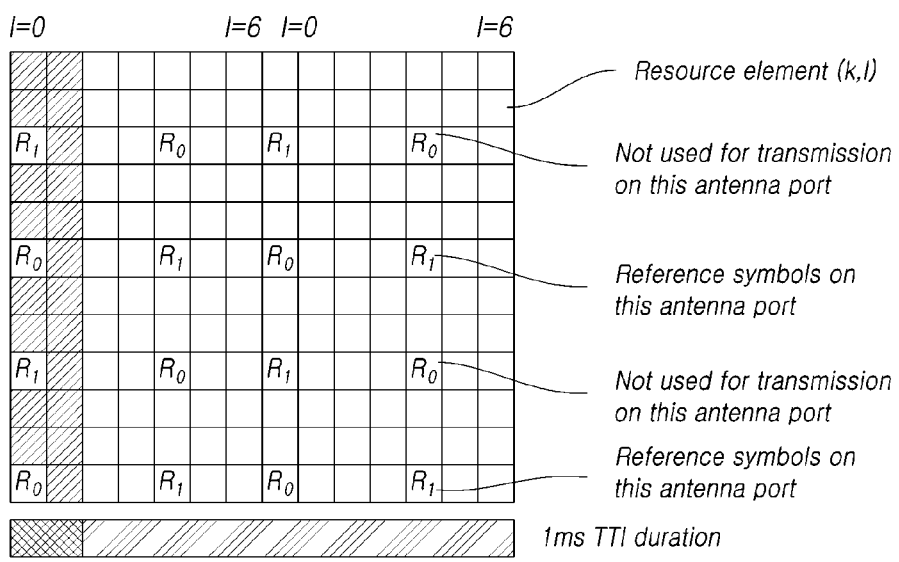
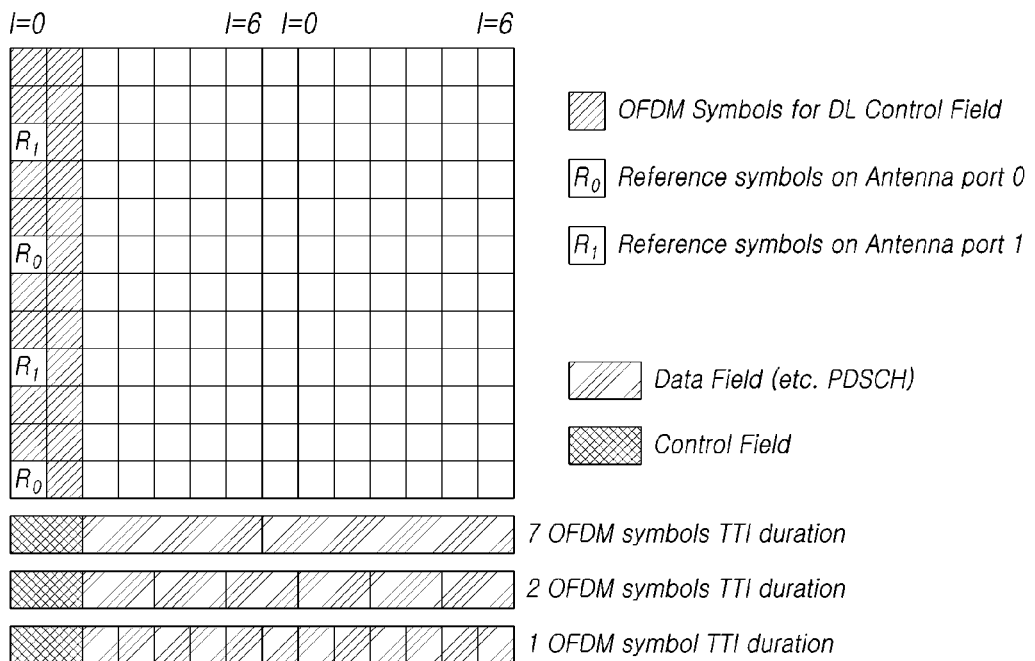

METHOD AND APPARATUS FOR TRANSMITTING AND RECEIVING CONTROL INFORMATION AND DATA IN FRAME STRUCTURE OF SHORT TRANSMISSION TIME INTERVAL

CROSS REFERENCE TO RELATED APPLICATIONS

This application is a National Stage Patent Application of PCT International Patent Application No. PCT/KR2017/004702 (filed on May 2, 2017) under 35 U.S.C. § 371, which claims priority to Korean Patent Application Nos. 10-2016-0055676 (filed on May 4, 2016), 10-2016-0058317 (filed on May 12, 2016), 10-2017-0056011 (filed on May 2, 2017), and 10-2017-0056206 (filed on May 2, 2017), the teachings of which are incorporated herein in their entireties by reference.

TECHNICAL FIELD

The present embodiments relate to operations of a user equipment and a base station for transmitting and receiving control information and data in $3^{rd}$ generation partnership project (3GPP) long term evolution (LTE)/LTE-Advanced systems.

BACKGROUND ART

Research and discussion are underway for latency reduction in 3GPP LTE/LTE-Advanced systems. The main purpose of latency reduction is to standardize the operation of a shorter transmission time interval (hereinafter, referred to as 'short TTI' or 'sTTI') in order to improve transmission control protocol (TCP) throughput.

To this end, radio access network working group 2 (RAN2) has been performing performance verification for a short TTI and conducted discussions on feasibility and performance of TTI lengths between 0.5 ms and one orthogonal frequency division multiplexing (OFDM) symbol, backward compatibility preservation, and the like.

Further, researches have been made on a physical layer for such a short TTI, and discussions have been conducted on downlink control information (DCI) configuration and detection. However, no specific procedure was introduced for search space configuration and blind decoding of a short physical downlink control channel (sPDCCH) and a legacy PDCCH, short TTI-based physical uplink control channel (PUCCH) configuration, and transmission and reception of an sPUSCH and a legacy sound reference signal (SRS).

DETAILED DESCRIPTION OF THE INVENTION

Technical Problem

An aspect of the present embodiments is to provide a method for search space configuration and blind decoding of an sPDCCH and a legacy PDCCH in a short TTI frame structure.

In addition, an aspect of the present embodiments is to provide a method for transmitting and receiving an uplink control channel and an uplink data channel in a short TTI-based frame structure and a user equipment and a base station for simultaneous transmission of an uplink data channel and a sounding reference signal.

Technical Solution

In accordance with an embodiment, a method may be provided for detecting downlink control information in a frame structure of a short transmission time interval. The method may include: receiving a downlink control channel of a first transmission time interval configured as a first aggregation level; receiving a downlink control channel of a second transmission time interval configured as a second aggregation level; and performing blind decoding based on the first aggregation level and the second aggregation level, wherein the first aggregation level and the second aggregation level are separated from each other.

According to another embodiment, a method of a user equipment may be provided for transmitting an uplink channel in a frame structure of a short transmission time interval. The method may include: receiving downlink data from a base station through a downlink data channel of a short transmission time interval; transmitting Ack/Nack for the downlink data to the base station through an uplink control channel of a short transmission time interval; and transmitting uplink data and a sounding reference signal to the base station through an uplink data channel of a short transmission time interval, wherein at least one of the uplink data and the sounding reference signal is transmitted through at least one of uplink data channels of short transmission time intervals included in one subframe.

According to further another embodiment, a method of a user equipment may be provided for transmitting an uplink channel in a frame structure of a short transmission time interval. The method may include: receiving downlink data from a base station through a downlink data channel of a short transmission time interval; configuring an uplink control channel of a short transmission time interval, the channel including Ack/Nack, by allocating individual cyclic shift values to the Ack/Nack, respectively; and transmitting the ACK/NACK for the downlink data to the base station through the uplink control channel of the short transmission time interval.

Advantageous Effects

According to embodiments, a specific scheme may be provided for configuring a search space for transmitting and receiving downlink control information (DCI) in a short TTI frame structure.

In addition, a specific scheme may be provided for sPUCCH configuration and transmission and reception in a short TTI-based frame structure. Furthermore, an uplink channel transmission/reception scheme may be provided for overcoming an overlap problem of an sPUSCH and SRS symbol duration.

BRIEF DESCRIPTION OF THE DRAWINGS

FIG. 2 is a diagram for illustrating resource mapping per physical resource block (PRB) in one subframe;

MODE FOR CARRYING OUT THE INVENTION

Figure 1:
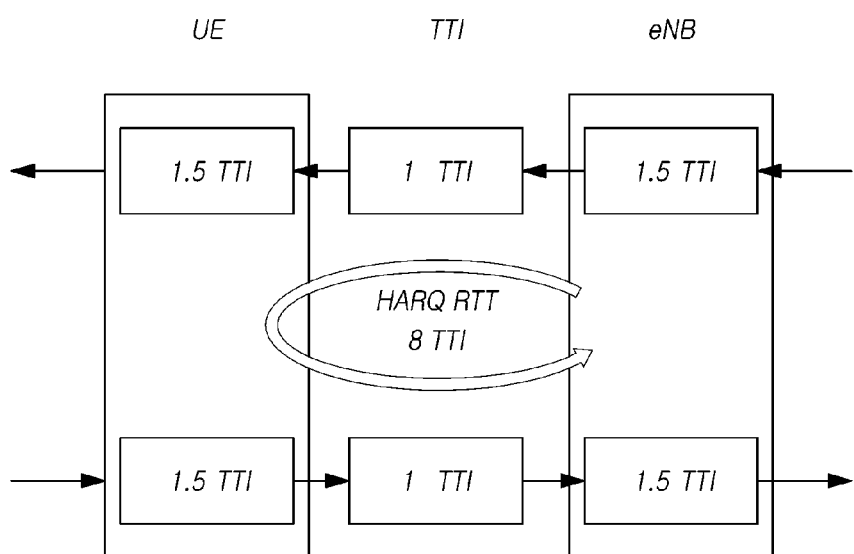
FIG. 1 is a diagram for illustrating processing delays and hybrid automatic repeat request (HARQ) round-trip delay time (RTT) in evolved node B (eNB) and user equipment (UE)

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure unclear.

In the present specifications, a machine type communication (MTC) terminal may refer to a terminal that is low cost (or is not very complex), a terminal that supports coverage enhancement, or the like. Alternatively, in the present specifications, the MTC terminal may refer to a terminal that is defined as a predetermined category for maintaining low costs (or low complexity) and/or coverage enhancement.

In other words, in the present specifications, the MTC terminal may refer to a newly defined 3GPP Release-13 low cost (or low complexity) UE category/type, which executes LTE-based MTC related operations. Alternatively, in the present specifications, the MTC terminal may refer to a UE category/type that is defined in or before 3GPP Release-12 that supports the enhanced coverage in comparison with the typical LTE coverage, or supports low power consumption, or may refer to a newly defined Release-13 low cost (or low complexity) UE category/type.

A wireless communication system may be widely installed to provide various communication services, such as a voice service, a packet data service, and the like. The wireless communication system may include a User Equipment (UE) and a Base Station (BS or an eNB). Throughout the specifications, the user equipment may be an inclusive concept indicating a user terminal utilized in wireless communication, including a User Equipment (UE) in wideband code division multiple access (WCDMA), long term evolution (LTE), high speed packet access (HSPA), and the like, and a Mobile Station (MS), a User Terminal (UT), a Subscriber Station (SS), a wireless device, and the like in global systems for mobile communication (GSM).

A base station or a cell may generally refer to a station that communicates with a User Equipment (UE) and may also be referred to as a Node-B, an evolved Node-B (eNB), a Sector, a Site, a Base Transceiver System (BTS), an Access Point, a Relay Node, a Remote Radio Head (RRH), a Radio Unit (RU), a small cell, and the like.

That is, the base station or the cell may be construed as an inclusive concept indicating a portion of an area covered by a Base Station Controller (BSC) in CDMA, a NodeB in WCDMA, an eNB or a sector (site) in LTE, and the like, and the concept may include various coverage areas, such as a megacell, a macrocell, a microcell, a picocell, a femtocell, a communication range of a relay node, a RRH, a RU, a small cell, and the like.

Each of the above mentioned various cells has a base station that controls a corresponding cell, and thus, the base station may be construed in two ways. i) The base station may be a device that provides a megacell, a macrocell, a microcell, a picocell, a femtocell, and a small cell in association with a wireless area, or ii) the base station may indicate the wireless area itself. In i), the base station may be all devices that interact with one another and are controlled by an identical entity in order to configure a predetermined wireless area or all devices that cooperate each other to configure the wireless area. Based on a configuration type of a wireless area, an eNB, an RRH, an antenna, an RU, an LPN, a point, a transmission/reception point, a transmission point, a reception point, and the like may be embodiments of a base station. In ii), the base station may be a wireless area itself that receives or transmits a signal from a perspective of a terminal or a neighboring base station.

Therefore, a megacell, a macrocell, a microcell, a picocell, a femtocell, a small cell, an RRH, an antenna, an RU, an LPN (Low Power Node), a point, an eNB, a transmission/reception point, a transmission point, and a reception point are commonly referred to as a base station.

In the specifications, the user equipment and the base station are used as two inclusive transceiving subjects to embody the technology and technical concepts described in the specifications. However, the embodiments are not limited to a predetermined term or word. In the specification, the user equipment and the base station are used as two (uplink or downlink) inclusive transceiving subjects to embody the technology and technical concepts described in the specifications. However, the embodiments are not limited to a predetermined term or word. Here, Uplink (UL) refers to data transmission and reception from a user equipment to a base station, and Downlink (DL) refers to data transmission and reception from a base station to a user equipment.

Varied multiple access schemes may be unrestrictedly applied to the wireless communication system. Various multiple access schemes, such as Code Division Multiple Access (CDMA), Time Division Multiple Access (TDMA), Frequency Division Multiple Access (FDMA), Orthogonal Frequency Division Multiple Access (OFDMA), OFDM-FDMA, OFDM-TDMA, OFDM-CDMA, and the like may be used. An embodiment of the present disclosure may be applicable to resource allocation in an asynchronous wireless communication scheme that is advanced through GSM, WCDMA, and HSPA, to be LTE and LTE-advanced, and may be applicable to resource allocation in a synchronous wireless communication scheme that is advanced through CDMA and CDMA-2000, to be UMB. The embodiments of the present disclosure may not be limited to a specific wireless communication field and may include all technical fields in which the technical idea of the present disclosure is applicable.

Uplink transmission and downlink transmission may be performed based on i) a Time Division Duplex (TDD) scheme that performs transmission based on different times or ii) a Frequency Division Duplex (FDD) scheme that performs transmission based on different frequencies.

Further, in a system such as LTE and LTE-A, a standard may be developed by configuring an uplink and a downlink based on a single carrier or a pair of carriers. The uplink and the downlink may transmit control information through a control channel, such as a Physical Downlink Control Channel (PDCCH), a Physical Control Format Indicator Channel (PCFICH), a Physical Hybrid ARQ Indicator Channel (PHICH), a Physical Uplink Control Channel (PUCCH), an Enhanced Physical Downlink Control Channel (EPDCCH), and the like, and may be configured as a data channel, such as a Physical Downlink Shared Channel (PDSCH), a Physical Uplink Shared Channel (PUSCH), and the like, so as to transmit data.

Control information may be transmitted using an EPDCCH (enhanced PDCCH or extended PDCCH).

In the present specification, a cell may refer to the coverage of a signal transmitted from a transmission/reception point, a component carrier having the coverage of the signal transmitted from the transmission/reception point (transmission point or transmission/reception point), or the transmission/reception point itself.

A wireless communication system, according to embodiments, refers to a Coordinated Multi-point transmission/reception (CoMP) system where two or more transmission/reception points cooperatively transmit a signal, a coordinated multi-antenna transmission system, or a coordinated multi-cell communication system. A CoMP system may include at least two multi-transmission/reception points and terminals.

A multi-transmission/reception point may be i) a base station or ii) a macro cell (hereinafter, referred to as an 'eNB') and at least one RRH connected to the eNB and controlled through an optical cable or an optical fiber and has a high transmission power or a low transmission power within a macro cell area.

Hereinafter, a downlink refers to communication or a communication path from a multi-transmission/reception point to a terminal, and an uplink refers to communication or a communication path from a terminal to a multi-transmission/reception point. In the downlink, a transmitter may be a part of a multi-transmission/reception point, and a receiver may be a part of a terminal. In an uplink, a transmitter may be a part of a terminal and a receiver may be a part of a multi-transmission/reception point.

Hereinafter, signal transmission and reception through a PUCCH, a PUSCH, a PDCCH, an EPDCCH, or a PDSCH, may be described through the expression, "a PUCCH, a PUSCH, a PDCCH, an EPDCCH, or a PDSCH is transmitted or received".

In addition, hereinafter, the expression "a PDCCH is transmitted or received, or a signal is transmitted or received through a PDCCH" may include the same meaning of "an EPDCCH is transmitted or received, or a signal is transmitted or received through an EPDCCH".

That is, a physical downlink control channel used herein may indicate a PDCCH or an EPDCCH and may indicate a meaning including both a PDCCH and an EPDCCH.

In addition, for ease of description, a part of embodiments is described using a PDCCH. However, an EPDCCH according to an embodiment of the present disclosure may be applied to the part of the embodiments.

Meanwhile, higher layer signaling includes an radio resource control (RRC) signaling that transmits RRC information including an RRC parameter.

An eNB executes downlink transmission to terminals. The eNB may transmit a Physical Downlink Shared Channel (PDSCH) which is a primary physical channel for unicast transmission and may transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, transmission and reception of a signal through each channel will be described as transmission and reception of a corresponding channel.

[Latency Reduction in RAN1]

Latency reduction Study Item has been approved by the RAN plenary meeting #69 [1]. The main purpose of latency reduction is to standardize shorter TTI operations in order to improve TCP throughput [2]. To this end, RAN2 has already performed performance verification for a short TTI [2].

Study is conducted on potential impacts related to RAN1 in the following range [1]:

Assess specification impact and study feasibility and performance of TTI lengths between 0.5 ms and one OFDM symbol, taking into account impact on reference signals and physical layer control signaling backwards compatibility shall be preserved (thus allowing normal operation of pre-Rel 13 UEs on the same carrier);

Latency reduction can be achieved by the following physical layer techniques:

short TTI reduced processing time in implementation new frame structure of TDD

Additional agreements at the 3GPP RAN WG1 meeting #84 are as follows.

Agreements:

Following design assumptions are considered:

No shortened TTI spans over subframe boundary

At least for SIBs and paging, PDCCH and legacy PDSCH are used for scheduling

The potential specific impacts for the followings are studied

UE is expected to receive a sPDSCH at least for downlink unicast sPDSCH refers PDSCH carrying data in a short TTI UE is expected to receive PDSCH for downlink unicast FFS whether a UE is expected to receive both sPDSCH and PDSCH for downlink unicast simultaneously FFS: The number of supported short TTIs If the number of supported short TTIs is more than one, Agreements:

Following design assumptions are used for the study

From eNB perspective, existing non-sTTI and sTTI can be FDMed in the same subframe in the same carrier FFS: Other multiplexing method(s) with existing non-sTTI for UE supporting latency reduction features Agreements:

In this study, following aspects are assumed in RAN1.

PSS/SSS, PBCH, PCFICH and PRACH, Random access, SIB and Paging procedures are not modified.

Following aspects are further studied in the next RAN1 meeting

Note: But the study is not limited to them.
Design of sPUSCH DM-RS
Alt. 1: DM-RS symbol shared by multiple short-TTIs within the same subframe
Alt. 2: DM-RS contained in each sPUSCH
HARQ for sPUSCH
Whether/how to realize asynchronous and/or synchronous HARQ
sTTI operation for Pcell and/or SCells by (e)CA in addition to non-(e)CA case Additional agreements at the 3GPP RAN WG1 meeting #84bis are as follows.

Working Assumption:
1-OFDM-symbol sTTI length will not be further studied
Agreements:
sPDCCH (PDCCH for short TTI) needs to be introduced for short TTI.
Each short TTI on DL may contain sPDCCH decoding candidates
Working Assumption:
CRS-based sPDCCH is recommended to be supported
FFS whether CRS-based sPDCCH can be transmitted in the legacy PDCCH region
DMRS-based sPDCCH is recommended to be supported
Design of both CRS-based sPDCCH and DMRS-based sPDCCH will be studied further.
Conclusions:
A maximum number of BDs will be defined for sPDCCH in USS
In case 2-level DCI is adopted, any DCI for sTTI scheduling carried on PDCCH may be taken into account in the maximum total number of BDs
FFS whether the maximum number is dependent on the sTTI length
FFS whether the maximum number of blind decodes for (E)PDCCH is reduced in subframes in which the UE is expected to perform blind decodes for sPDCCH
FFS whether a UE may be expected to monitor both EPDCCH and sPDCCH in the same subframe
FFS whether the maximum number of BDs on PDCCH is changed from the legacy number
if DCI on PDCCH is for sTTI scheduling
Conclusion for Study Till RAN1#85:
Two-level DCI can be studied for sTTI scheduling, whereby:
DCI for sTTI scheduling can be divided into two types:
"Slow DCI": DCI content which applies to more than 1 sTTI is carried on either legacy PDCCH, or sPDCCH transmitted not more than once per subframe
FFS whether "Slow DCI" is UE-specific or common for multiple UEs
"Fast DCI": DCI content which applies to a specific sTTI is carried on sPDCCH
For a sPDSCH in a given sTTI, the scheduling information is obtained from either:
a combination of slow DCI and fast DCI, or
fast DCI only, overriding the slow DCI for that sTTI
Compare with single-level DCI carried on one sPDCCH or one legacy PDCCH.
It is not precluded to consider schemes in which the slow DCI also includes some resource allocation information for the sPDCCH.

Methods for reducing the overhead of single-level DCI can also be studied
Single-level DCI multi-sTTI scheduling for a variable number of sTTIs may be included
Aim to reduce the number of schemes under consideration at RAN1#85.
Both CRS based TMs and DMRS based TMs are recommended to be supported for DL sTTI transmission
No change for CRS definition
FFS: Supporting more than 2 layers for sPDSCHs
Further study is needed about DMRS design(s) for sPDSCH demodulation
For a certain TTI length, increased PRB bundling sizes may be necessary to achieve sufficient channel estimation accuracy.
FFS: the number of DMRS antenna ports that can be supported for a given short-TTI length.
For a certain TTI length, new DMRS design(s) may be needed
Agreements:
A UE is expected to handle the following cases in the same carrier in a subframe
Receiving legacy TTI non-unicast PDSCH (except FFS for SC-PTM) and short TTI unicast PDSCH
Receiving legacy TTI non-unicast PDSCH (except FFS for SC-PTM) and legacy TTI unicast PDSCH(s)
FFS between:
Alt 1: A UE is not expected to receive legacy TTI unicast PDSCH and short TTI unicast PDSCH simultaneously on one carrier
Alt 2: If the UE is scheduled with legacy TTI unicast PDSCH and short TTI unicast PDSCH simultaneously on one carrier, then it may skip the decoding of one of them (FFS rules for determining which one)
Alt 3: A UE is expected to receive legacy TTI unicast PDSCH and short TTI unicast PDSCH simultaneously on one carrier
FFS UE behaviour in case of being scheduled with legacy TTI unicast PDSCH and short TTI unicast PDSCH simultaneously with legacy TTI non-unicast PDSCH (except FFS for SC-PTM) on the same carrier
A UE can be dynamically (with a subframe to subframe granularity) scheduled with legacy TTI unicast PDSCH and/or (depends on outcome of FFS above) short TTI PDSCH unicast
Agreements:
A UE can be dynamically (with a subframe to subframe granularity) scheduled with PUSCH and/or sPUSCH
A UE is not expected to transmit PUSCH and short TTI sPUSCH simultaneously on the same REs, i.e. by superposition
FFS whether a UE may transmit PUSCH and short TTI sPUSCH in the same subframe on one carrier by puncturing PUSCH
FFS whether a UE may transmit PUSCH and short TTI sPUSCH in different PRBs on the same symbol(s)
Dropping/prioritization rules (if any) are FFS
Agreements:
It is recommended to support PHICH-less asynchronous UL HARQ for PUSCH scheduled in a short TTI (i.e. for sPUSCH)
If DL data transmission is scheduled in a short TTI, the processing time for preparing the HARQ feedback by UE and the processing time for preparing a potential retransmission by eNB are assumed to be reduced
FFS: the extent of processing time reduction If UL data transmission is scheduled in a short TTI, the processing time for preparing UL data transmission upon UL grant reception at UE and the processing time for scheduling a potential retransmission by eNB are assumed to be reduced FFS: the extent of processing time reduction Study whether it is beneficial to limit the maximum TA value supported in conjunction with latency reduction Note that this would restrict the deployment scenarios for latency reduction.

FFS whether processing time reductions can also be applied to legacy TTI transmissions for UEs that support short TTI Basically, in Average down-link latency calculation, a latency is calculated according to the following procedures [3].

Following the same approach as in section B.2.1 in 3GPP TR 36.912, the LTE U-plane one-way latency for a scheduled UE consists of the fixed node processing delays and 1 TTI duration for transmission, as shown in FIG. 1 below. Assuming the processing times can be scaled by the same factor of TTI reduction keeping the same number of HARQ processes, the one way latency can be calculated as $D$=1.5 TTI(eNB processing and scheduling)+1 TTI (transmission)+1.5 TTI(UE processing)+$n$*8 TTI(HARQ retransmissions)

=(4+$n$*8)TTI.

Considering a typical case where there would be 0 or 1 retransmission, and assuming error probability of the first transmission to be p, the delay is given by $D$=(4+$p$*8)TTI.

So, for 0% BLER, $D$=4*TTI,

And for 10% BLER, $D$=4.8*TTI.

Average UE Initiated UL Transmission Latency Calculation

Assume UE is in connected/synchronized mode and wants to do UL transmission, e.g., to send TCP ACK. Following table shows the steps and their corresponding contribution to the UL transmission latency. To be consistent in comparison of DL and UL, we add the eNB processing delay in the UL after the UL data is received by the eNB (step 7).

TABLE 1

UL transmission latency calculation

| Step | Description | Delay |
| --- | --- | --- |
| 1. | Average delay to next SR opportunity | SR periodicity/2 |
| 2. | UE sends SR | 1 TTI |
| 3. | eNB decodes SR and generates scheduling grant | 3 TTI |
| 4. | Transmission of scheduling grant (assumed always error free) | 1 TTI |
| 5. | UE processing delay (decoding Scheduling grant + L1 encoding of data) | 3 TTI |
| 6. | UE sends UL transmission | (1 + p * 8) TTI where p is initial BLER. |
| 7. | eNB receives and decodes the UL data | 1.5 TTI |

Resource Mapping of Short TTI [3]

In FIG. 2 the resource map above is the legacy resource mapping per PRB in one subframe, considering 2 Antenna ports and 2 OFDM symbols control field. In FIG. 2 the resource map below is the short TTI resource mapping, considering 2 OFDM symbols used for the control field in order to ensure the backward compatibility. The loss rates ($L_{legacy}$, e.g. 5%-50%) of the PHY layer in short TTI duration are assumed.

TBS Calculation of Short TTI

According to the resource mapping and the TBS calculation formula given above, the loss rate of PHY layer for legacy PDSCH is calculated as follows:

$$L_{legacy} = \frac{\text{the number of reference symbols within } PDSCH}{\text{the number of } REs \text{ within } PDSCH} = \frac{12}{144} = 8.3\%$$

For different short TTI duration, the TBS of short TTI PDSCH is calculated as the following table 2:

TABLE 2

TBS calculation for different TTI duration

| TTI Duration | TBS of short TTI PDSCH (TBS short) |
| --- | --- |
| 7 OFDM symbol | First time slot:<br>$TBS_{short} = TBS_{legacy} \times \frac{60}{144} \times \frac{1 - L_{short}}{1 - 8.3\%}$<br>Second time slot:<br>$TBS_{short} = TBS_{legacy} \times \frac{84}{144} \times \frac{1 - L_{short}}{1 - 8.3\%}$ |
| 2 OFDM symbol | $TBS_{short} = TBS_{legacy} \times \frac{24}{144} \times \frac{1 - L_{short}}{1 - 8.3\%}$ |
| 1 OFDM symbol | $TBS_{short} = TBS_{legacy} \times \frac{12}{144} \times \frac{1 - L_{short}}{1 - 8.3\%}$ |

As described above, research on a physical layer for a short TTI is underway, and discussion on DCI configuration and detection is underway. Specifically, there is no scheme for search space configuration and blind decoding of an sPDCCH and a legacy PDCCH.

The present disclosure proposes a scheme for search space configuration and blind decoding of an sPDCCH and a legacy PDCCH for a short TTI frame.

Basically, for PDCCH detection, blind decoding is performed on the basis of a hashing function given based on the following aggregation level and PDCCH candidate.

$$S_k^{(L)} = L \cdot \{(Y_k + m) \bmod \lfloor N_{CCE,k} / L \rfloor\} + i$$

$$\begin{cases} L \in \{1, 2, 4, 8\} \\ i = 0, \ldots, L-1 \\ m = 0, \ldots, M^{(L)} - 1 \end{cases}$$

TABLE 3

Search space and aggregation level (TS 36.213)

| Type | Search Space Aggregation level L | Size [in CCEs] | Number of PDCCH candidates $M^{(L)}$ |
| --- | --- | --- | --- |
| UE-specific | 1 | 6 | 6 |
|  | 2 | 12 | 6 |
|  | 4 | 8 | 2 |
|  | 8 | 16 | 2 |

TABLE 3-continued

Search space and aggregation level (TS 36.213)

| Type | Search Space Aggregation level L | Size [in CCEs] | Number of PDCCH candidates $M^{(L)}$ |
|---|---|---|---|
| Common | 4 | 16 | 4 |
|  | 8 | 16 | 2 |

Figure 3:
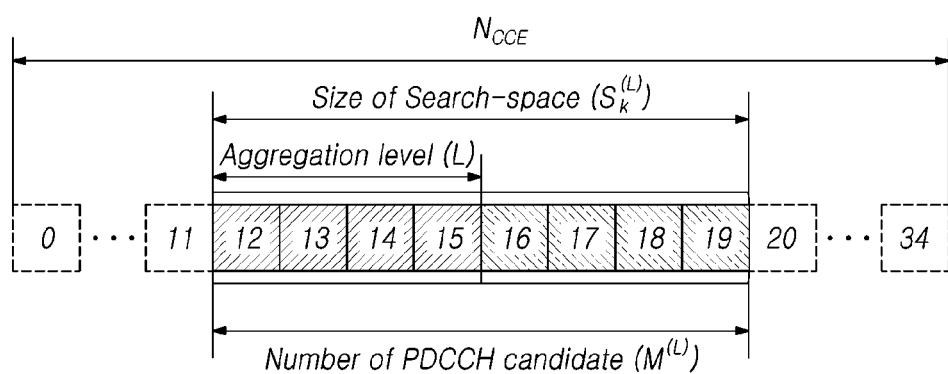
FIG. 3 is a diagram for illustrating concept and definition of a search space.
Figure 4:
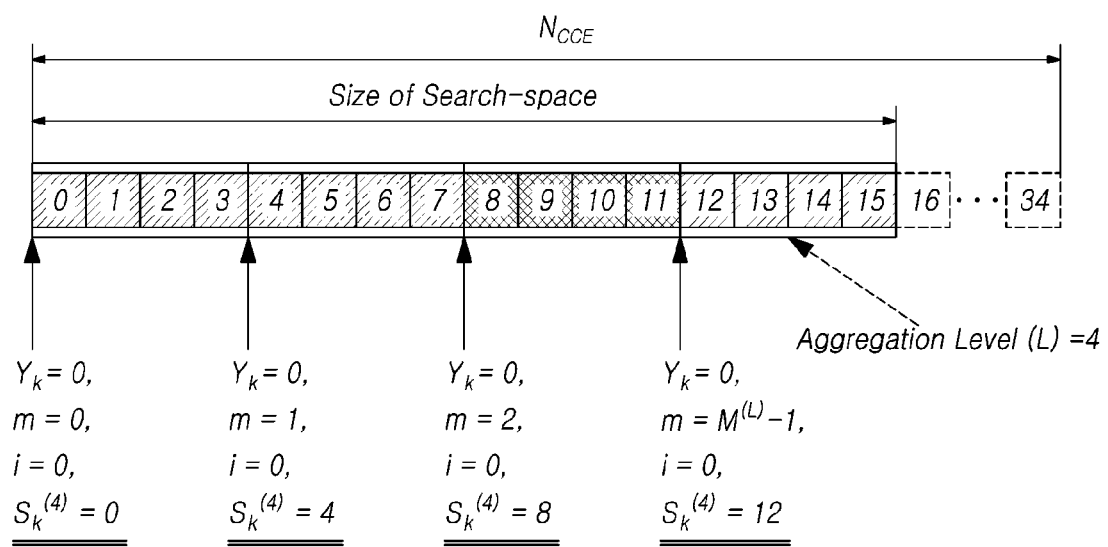
FIG. 4 is a diagram for illustrating concept and definition of a common search space.
Figure 5:
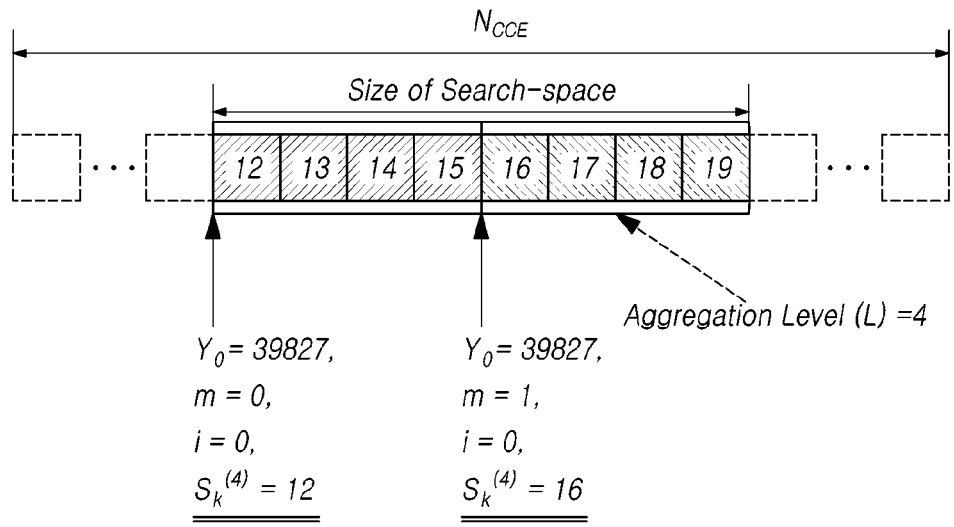
FIG. 5 is a diagram for illustrating concept and definition of a UE-specific search space.

FIG. 3 is a conceptual diagram for describing definition of a search space, FIG. 4 is a conceptual diagram for describing definition of a common search space, and FIG. 5 is a conceptual diagram for describing definition of a UE-specific search space.

The search space definition and blind decoding procedure using the given hashing function are as follows.
1) Search space definition
Search Space (Cont'd)
The variable $Y_k$
For the COMMON search space $Y_k = 0$, $L \in \{4,8\}$ For the UE-specific search space $Y_k = (A \cdot Y_{k-1}) \bmod D$ $$\begin{cases} L \in \{1, 2, 4, 8\} \\ Y_{-1} = n_{RNTI} \neq 0 \\ A = 39827, D = 65537 \\ k = \lfloor n_s/2 \rfloor \to \text{Subframe index(from 0 to 9)} \\ n_s = 0, \ldots, 19 \to \text{Slot number(from 0 to 19)} \end{cases}$$

Size of search space
CCE units
The size depends on the type and aggregation level of search space
4 kinds of size: 6, 8, 12, 16 [CCEs]
Number of PDCCH candidates $M^{(L)} Y_k$
The set of PDCCH candidates to monitor are defined in terms of search spaces
Mainly connected to the aggregation level $M^{(L)} = S_k^{(L)}/L$ 2) Relationship Between $Y_k$ and Search Space
Offset of starting-point of search space
Offset($Y_k$) has UE-specific value within UE-specific search space
Offset($Y_k$) is fixed by zero in common search space
Example: CommonSearchSpace
Aggregation level (L): 4, $N_{CCE}$=35
Size of Search space: 16 CCEs
Number of candidate ($M^{(L)}$): 4
$Y_k = 0$ ($Y_k$ does not get affected by $n_{RNTI}$)

$S_k^{(4)} = L \cdot \{(Y_k + m) \bmod \lfloor N_{CCE,k}/L \rfloor\} + i = 4 \cdot \{(0+m) \bmod 8\} + i$ Example: UE-specific Search Space
Aggregation level (L): 4, $N_{CCE}$=35
Size of Search space: 8 CCEs
Number of candidate ($M^{(L)}$): 2

$Y_k = (A \cdot Y_{k-1}) \bmod D \to Y_0 =$ $$(A \cdot Y_{-1}) \bmod D = 39827 \begin{cases} k = \lfloor n_s/2 \rfloor = \lfloor 0/2 \rfloor = 0 \\ n_{RNTI} = 0001(hex) \\ n_s = 0 \end{cases}$$

$S_k^{(L)} = L \cdot \{(Y_k + m) \bmod \lfloor N_{CCE,k}/L \rfloor\} + i \to S_0^{(4)} =$ $4 \cdot \{(Y_0 + m) \bmod \lfloor N_{CCE,0}/L \rfloor\} + i =$ $4 \cdot \{(39827 + m) \bmod 8\} + i = 4 \cdot \{(3+m) \bmod 8\} + i$ Resultantly, in order for a user equipment to search its PDCCH on the basis of the defined search space, the maximum number of blind decodings is determined as follows.

That is, for all aggregation levels 1, 2, 4, and 8, PDCCH candidates are UESS=16 and CSS=6. Therefore, since the PDCCH formats to be found in each transmission mode include two DCI format (1A+α'), there are a total of 44 blind decodings (based on a Legacy PDCCH).

TABLE 4

| Type | Search Space Aggregation level L | Size [in CCEs] | Number of PDCCH candidates $M^{(L)}$ |
|---|---|---|---|
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |
| Max number of BDs |  |  | 22 × 2 = 44 BDs |

The present disclosure provides a definition of a search space for two-level DCI in consideration of an sTTI and introduces a blind decoding operation of a user equipment.

The two-level DCI are currently considered in latency reduction. Such a two-level DCI may be divided into 'slow DCI' and 'fast DCI'.

As described, the present disclosure provides blind decoding of the user equipment.

It is better to distribute the complexity of blind decoding to a legacy PDCCH and a short PDCCH (sPDCCH). Therefore, the following method is suggested in the present disclosure.

Scheme 1-1. i) Defining a Search Space of a Relative High Aggregation Level in a Legacy PDCCH, ii) Allocating a Search Space of a Relatively Low Aggregation Level in an sPDCCH, and iii) not Defining Blinding Decoding for the Same Aggregation Level Between the Two Search Spaces.

In the present disclosure, a search space is defined separately in a legacy PDCCH region and an sPDCCH region in order minimally increase the maximum blind decoding of a user equipment.

Figure 6:
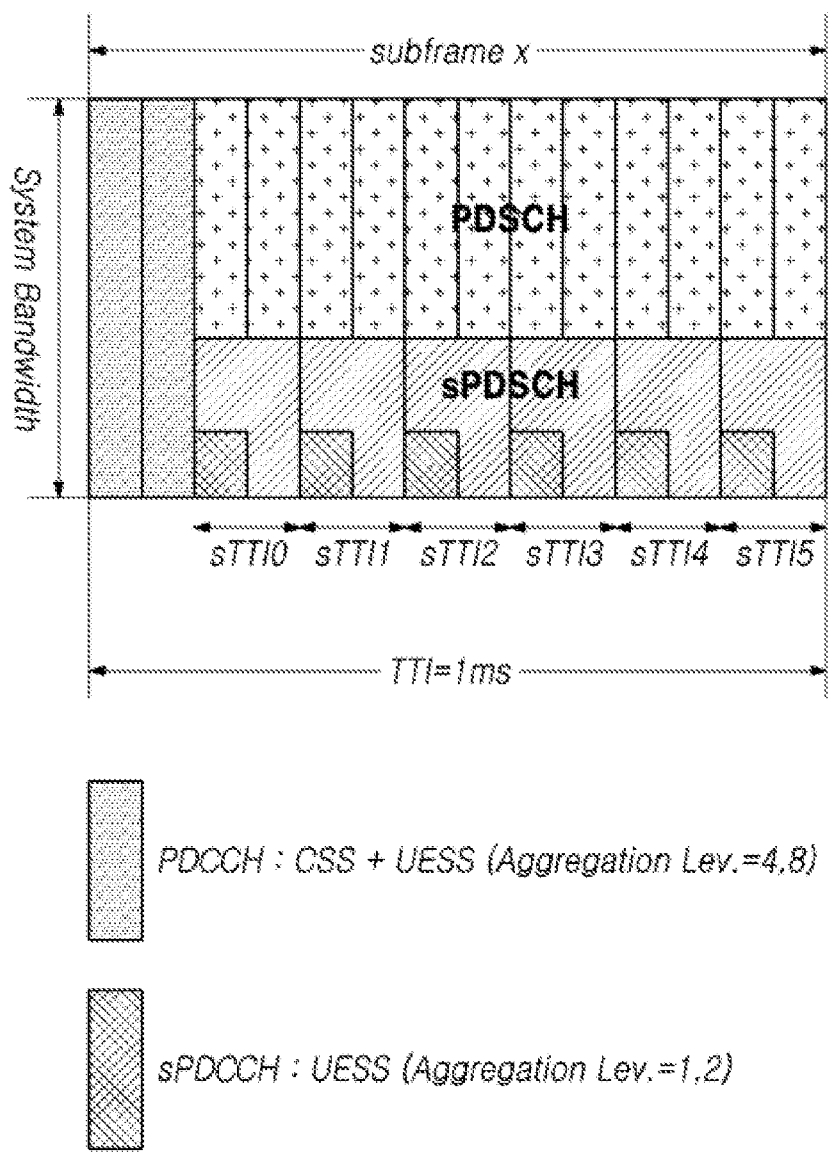
FIG. 6 is a diagram for illustrating concept (scheme 1-1) of separation of a search space for an sTTI according to embodiments.

For example, as shown in FIG. 6, only the typical common search space and a UE-specific search space of aggregation level=4 and 8 are defined in the legacy PDCCH region, and only a UE-specific search space of a relatively low aggregation level=1 and 2 is defined in an sPDCCH of each sTTI.

Since the sTTI-based sPDCCH is expected to have a relatively smaller available resource than the legacy PDCCH, only the aggregation level using a relatively small resource is allowed in sPDCCH definition. Basically, since the common search space uses aggregation level=4 and 8, it may be advantageous for the reduction of overhead to define the common search space in the legacy PDCCH.

The separation of each search space may be flexibly applied through additional signaling during sTTI configuration. That is, when a set for aggregation level L of the UE-specific search space is signaled, the user equipment performs blind decoding for aggregation level of a search space configured according to a configured method.

Specifically, for example, in the case of FIG. 6, the following blind decoding is defined.

$$L\{(Y_k+m') \bmod \lfloor N_{CCE,k}/L \rfloor\}+i$$

Legacy PDCCH

Common search space: Aggregation level L={4,8}
UE specific search space: Aggregation level L={4,8}
sPDCCH: the number of BDs=BD for each sTTI X No. of sTTI in a subframe
UE specific search space: Aggregation level L={1,2}

Scheme 1-2. i) Defining Only a Common Search Space in a Legacy PDCCH, and ii) Defining Only a UE-Specific Search Space in an sPDCCH.

Unlike the above-mentioned scheme 1-1, in the scheme 1-2, only the common search space is defined in the legacy PDCCH, and all the remaining UE-specific search spaces are defined in the sPDCCH because it might be overhead to define even a common search space region in the sPDCCH.

That is, in the legacy PDCCH, aggregation level L=4 and 8 corresponding to the common search space is defined, and aggregation level L=1, 2, 4, and 8 corresponding to the UE-Specific search space is defined in the sPDCCH.

Specifically, for example, a hashing function may be defined as shown in the following equation.

$$L\{(Y_k+m') \bmod \lfloor N_{CCE,k}/L \rfloor\}+i$$

Legacy PDCCH

Common search space: Aggregation level L={4,8}
sPDCCH: the number of BDs=BD for each sTTI X No. of sTTI in a subframe
UE specific search space: Aggregation level L={1, 2, 4, 8}

Scheme 1-3. i) Defining Only the Minimum Aggregation Level in an sPDCCH, and ii) Defining the Remaining Search Space in a Legacy PDCCH.

In the scheme 1-3, only the minimum aggregation level is allocated to the sPDCCH, and the remaining search space is allocated to the legacy PDCCH.

For example, the lowest aggregation level among the search spaces defined in the current 3GPP LTE/LTE-Advanced standards is L=1. Therefore, in this case, since the lowest aggregation level is 1, search space allocation shown in FIG. 7 is performed.

In conclusion, scheme 1-3 requires the lowest resource for the sPDCCH. Accordingly, scheme 1-3 generates the lowest control overhead for an sTTI.

Figure 7:
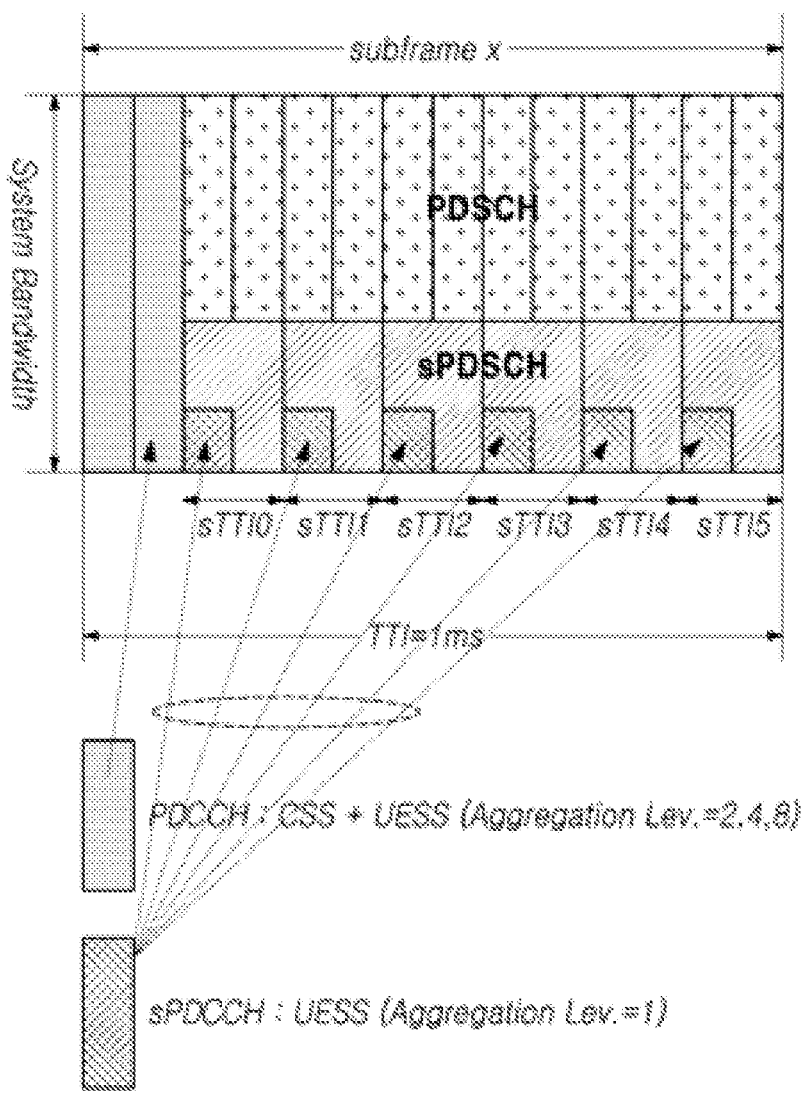
FIG. 7 is a diagram for illustrating concept (scheme 1-3) of separation of a search space for an sTTI according to embodiments.

For example, the following blind decoding may be defined in the case of FIG. 7.

$$L\{(Y_k+m') \bmod \lfloor N_{CCE,k}/L \rfloor\}+i$$

Legacy PDCCH

Common search space: Aggregation level L={4,8}
UE specific search space: Aggregation level L={2,4,8}
sPDCCH: the number of BDs=BD for each sTTI X No. of sTTI in a subframe
UE specific search space: Aggregation level L={1}

Scheme 1-4. Defining the Lowest CCE Index for sPDSCH A/N Configuration by Applying an Offset of an sTTI Subframe Unit.

In the scheme 1-4, a CCE indexing scheme according to search space separation is suggested. Although separate CCE index may be performed for each region, in some cases, it may be required to align search spaces defined in the legacy PDCCH and the sPDCCH in a subframe.

Therefore, three CCE indexing methods for a search space are introduced as follows.

Scheme 1-4-1) a Legacy PDCCH and an sPDCCH Configure a Separate Search Space.

Figure 8:
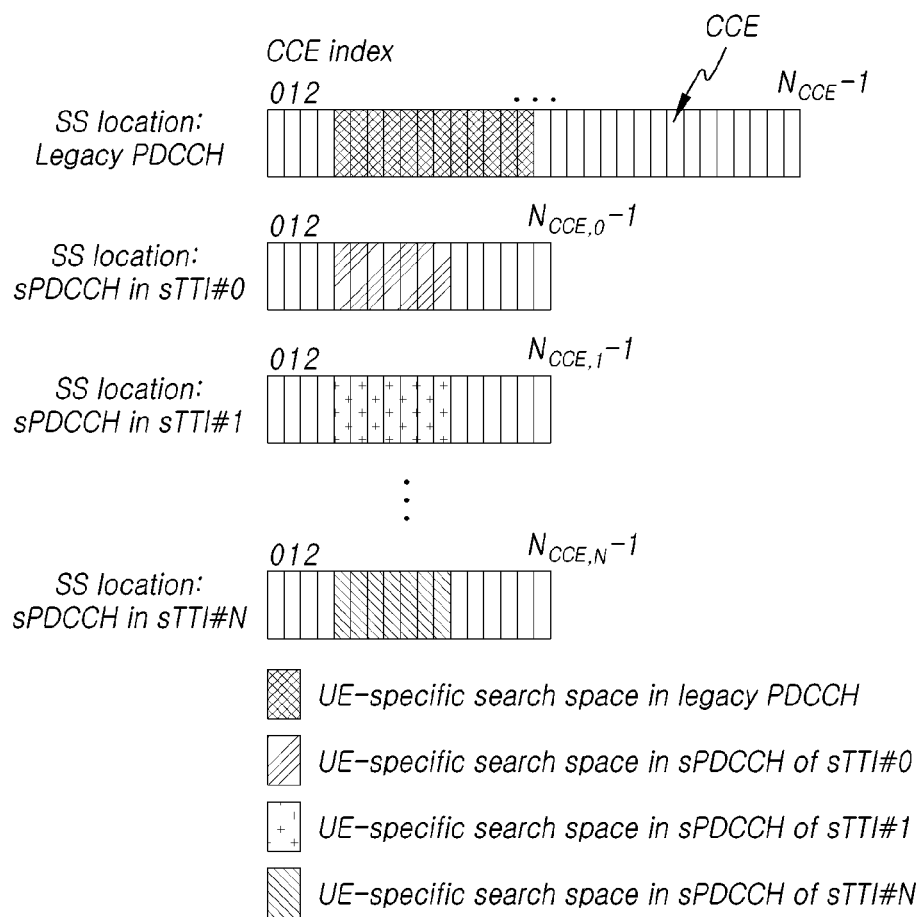
FIG. 8 is a diagram for illustrating a search space-based CCE indexing method according to scheme 1-4-1 at the time of search space separation according to embodiments.

FIG. 8 is a diagram for illustrating configuring separate search spaces of the legacy PDCCH and the sPDCCH.

Referring to FIG. 8, search spaces of the legacy PDCCH and the sPDCCH are separately configured, and CCE indexes are independently assigned to the legacy PDCCH and the sPDCCH, respectively.

Scheme 1-4-2) Configuring a Search Space by Connecting an sPDCCH for Each sTTI to a Legacy PDCCH.

Figure 9:
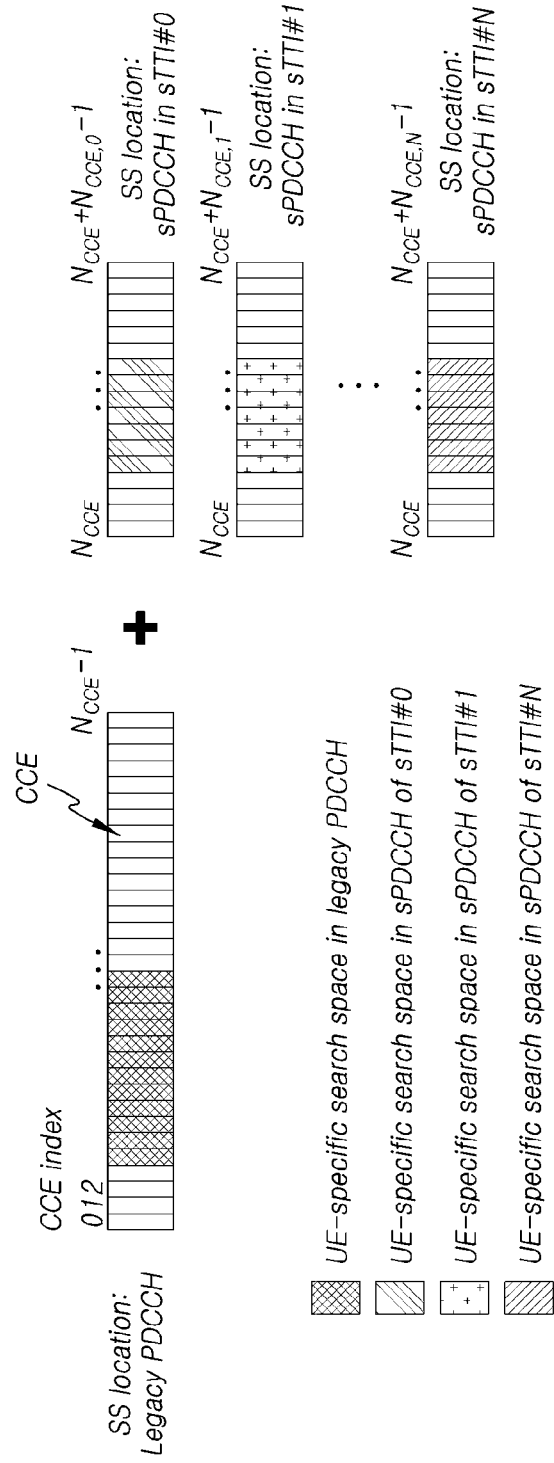
FIG. 9 is a diagram for illustrating a search space-based CCE indexing method according to scheme 1-4-2 at the time of search space separation according to embodiments.

FIG. 9 is a diagram for illustrating configuring a search space by connecting an sPDCCH for each sTTI to a legacy PDCCH.

Referring to FIG. 9, a search space is configured by connecting an sPDCCH for each sTTI to a legacy PDCCH. Therefore, the CCE index of the sPDCCH for each sTTI is assigned subsequent to CCE index of the legacy PDCCH.

Scheme 1-4-3) Configuring a Continuous Search Space by Arranging an Offset for Each sTTI in a Legacy PDCCH.

Figure 10:
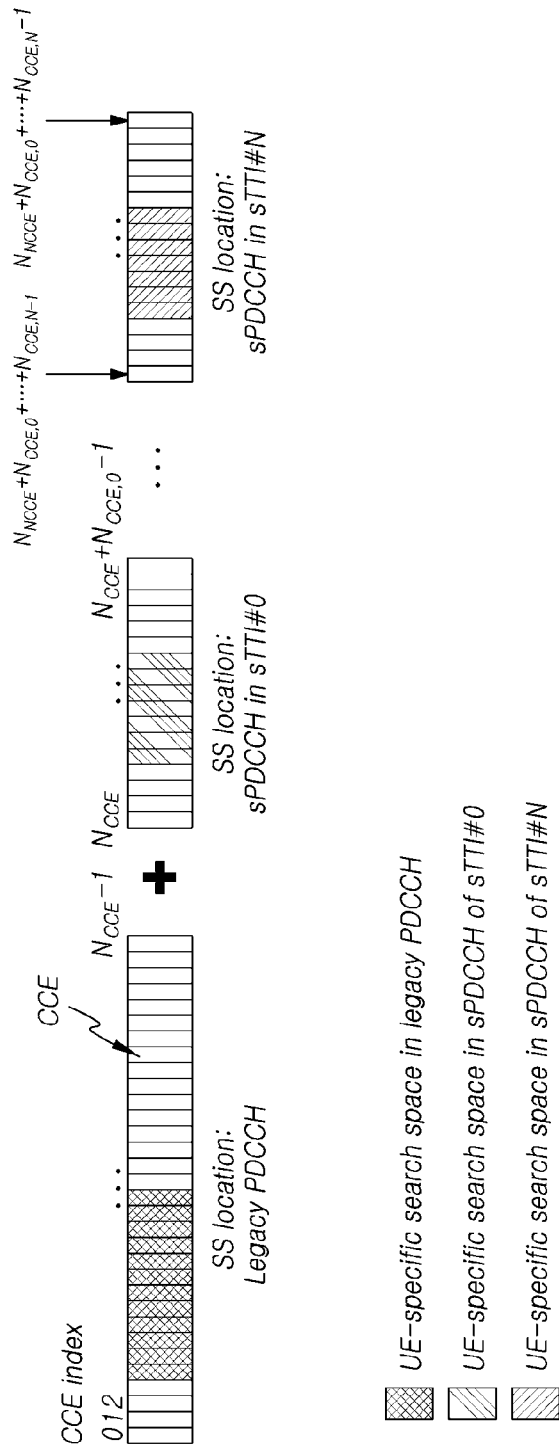
FIG. 10 is a diagram for illustrating a search space-based CCE indexing method according to scheme 1-4-3 at the time of search space separation according to embodiments.

FIG. 10 is a diagram for illustrating configuring a search space by connecting an sPDCCH to a legacy PDCCH with an offset for each sTTI therebetween.

Referring to FIG. 10, sPDCCHs are sequentially connected to the legacy PDCCH to configure a search space, so that CCE indexes of the sPDCCHs are assigned in order of a legacy PDCCH, an sPDCCH of sTTI #0, an sPDCCH of sTTI #1, . . . , an sPDCCH of sTTI #N.

In the present disclosure, a method for configuring a search space for transmitting and receiving sTTI-based DCI is described. Furthermore, the the method may be applied to related signals and channels.

Figure 11:
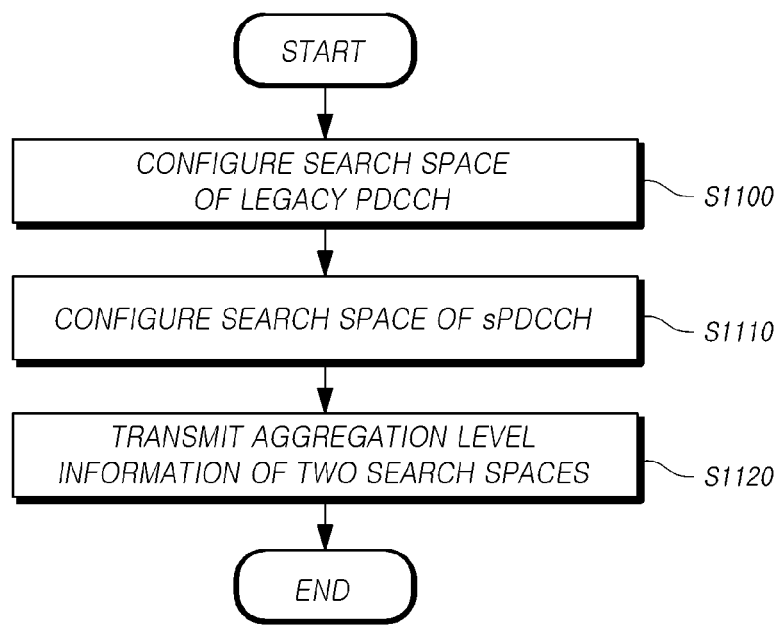
FIGS. 11 and 12 are flowcharts for illustrating a method for detecting DCI in an sTTI frame structure according to embodiments.

FIG. 11 is a flowchart for illustrating a method for detecting DCI in an sTTI frame structure according to embodiments, and illustrates a method of a base station for configuring search spaces for a legacy PDCCH and an sPDCCH.

Referring to FIG. 11, the base station configures a search space of the legacy PDCCH (S1100) and configures a search space of the sPDCCH (S1110).

In accordance with an embodiment, the base station may separately configure search spaces of the legacy PDCCH and the sPDCCH.

For example, the base station configures the search space of the legacy PDCCH with a relatively high aggregation level (e.g., L=4 and 8) and configures the search space of the sPDCCH with a relatively low aggregation level (e.g., L=1 and 2) in order to separately configure the search spaces of the legacy PDCCH and the sPDCCH.

The search space of the sPDCCH may be configured with only the lowest aggregation level of L=1, and the search space of the legacy PDCCH may be configured with the remaining aggregation levels of L=2, 4, and 8.

Alternatively, the search space of the legacy PDCCH may be configured as a common search space, and the search space of the sPDCCH may be configured as a UE-specific search space.

The base station may transmit, to a user equipment, information on the aggregation level of the search space of the legacy PDCCH and information on the aggregation level of the search space of the sPDCCH (S1120), and transmit information on the aggregation level through additional signaling at the time of sTTI configuration.

Figure 12:
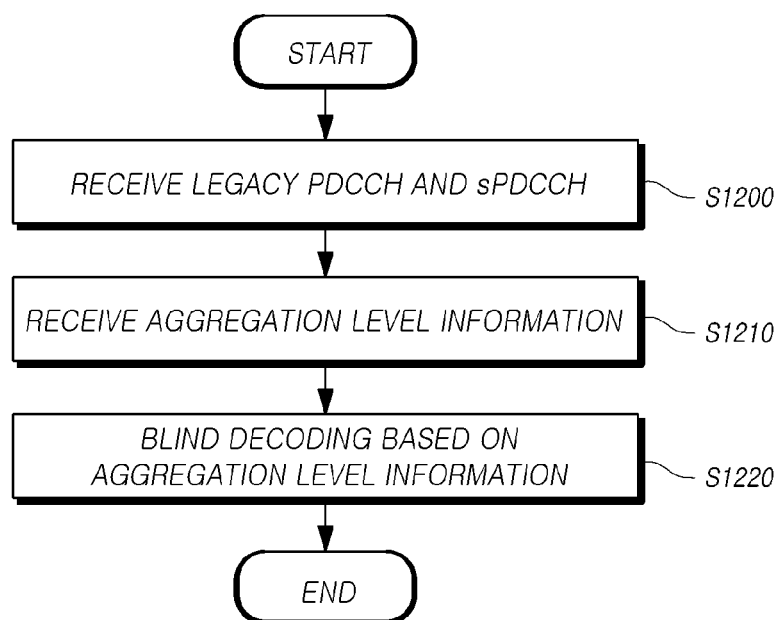

FIG. 12 is a flowchart for illustrating a method for detecting DCI in an sTTI frame structure according to the present embodiments and a method of a user equipment for performing blind decoding.

Referring to FIG. 12, a user equipment receives a legacy PDCCH and an sPDCCH from a base station (S1200).

The user equipment receives information on the aggregation level which configures search spaces of the legacy PDCCH and the sPDCCH through sTTI configuration information (S1210).

For example, the user equipment may receive information on a search space of the legacy PDCCH, configured with a relatively high aggregation level L=4 and 8, and information on a search space of the sPDCCH, configured with a relatively low aggregation level L=1 and 2.

The search space of the sPDCCH may be configured with only the minimum aggregation level L=1.

Alternatively, the user equipment may receive information on a search space of the legacy PDCCH, configured with the aggregation level corresponding to a common search space, and information on a search space of the sPDCCH, configured with a UE-specific search space.

The user equipment confirms information on the search space received from the base station, that is, information on aggregation level defined in each PDCCH, and performs blind decoding based on the information (S1220).

The search space of the Legacy PDCCH and the search space of the sPDCCH are separated, and information on the separated search space is signaled to the user equipment. Accordingly, the user equipment may reduce the complexity of blind decoding and perform blind decoding.

Further, the present disclosure provides s methods of a user equipment and a base station for sPUCCH, sPUSCH (short TTI based PUSCH), and SRS transmission in a short TTI-based frame structure.

Figure 13:
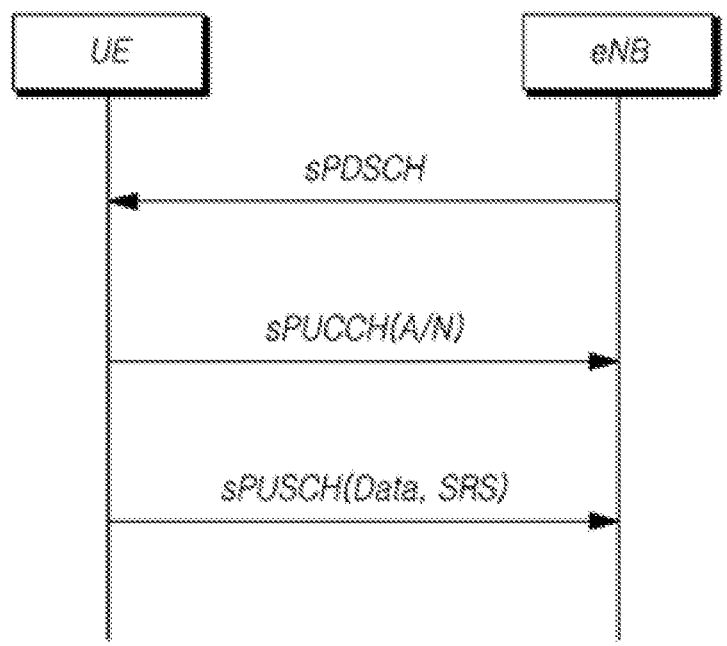
FIG. 13 is a diagram for illustrating an uplink channel transmission scheme in an sTTI-based frame structure.

FIG. 13 is a signal flow chart for illustrating signal transmission and reception between a user equipment and a base station in a short TTI-based frame structure.

In the short TTI-based frame structure, an sTTI includes 2 or 3 symbols. The user equipment receives an sTTI-based sPDSCH from the base station through a downlink data channel.

When the user equipment receives the sPDSCH, the user equipment transmits Ack/Nack for the received sPDSCH through an sTTI-based sPUCCH and transmits uplink data and a sounding reference signal (SRS) through an sPUDSH.

The user equipment configures the sPUCCH for transmitting Ack/Nack through an sTTI including 2 or 3 symbols.

In the typical PUCCH, OCC (spreading)+CS (cyclic shift) based resource allocation is performed based on formats 1a and 1b to transmit the Ack/Nack in the typical PUCCH. Since the number of symbols decreases in the sPUCCH, a Zadoff-Chu (ZC) sequence CS-based Ack/Nack multiplexing resource allocation is proposed by excluding the existing OCC. That is, unlike the typical structure, the sPUCCH for Ack/Nack transmission is configured without using OCC spreading.

For example, unlike an Ack/Nack scheme of the typical PUCCH, the sPUCCH may be configured not to include a RS and to include only data symbols including an Ack/Nack message.

Therefore, an eNB may need to detect only on/off signaling in order to detect an sPUCCH unlike the typical method that decodes an Ack/Nack message after performing channel estimation through the RS.

For the On/Off signaling, since there is no channel estimation process and it is impossible to simultaneously express Ack/Nack in one symbol, the user equipment uses two or more multi-CS resources to express an Ack/Nack message. In other words, in order for the user equipment to express ACK or Nack, two individual CS values are required, and two CS values are allocated to each user equipment to configure an Ack/Nack message.

It is possible to assume that there are fewer user equipments in the sPUCCH, as compared to user equipments in the typical PUCCH. Further, all user equipments do not require a latency reduction based service. Accordingly, the sPUCCH may be configured by allocating two individual CS values to one user equipment.

Meanwhile, at the time of transmission of a short TTI-based sPUSCH, the user equipment may have a corresponding Sounding Reference Signal (SRS) and a simultaneous transmission interval. In the typical current low-latency-related operation, the following operation is considered as an alternative in a downlink.

Alt 1: A UE is not expected to receive legacy TTI unicast PDSCH and short TTI unicast PDSCH simultaneously on one carrier Alt 2: If the UE is scheduled with legacy TTI unicast PDSCH and short TTI unicast PDSCH simultaneously on one carrier, then it may skip the decoding of one of them (FFS rules for determining which one)

Alt 3: A UE is expected to receive legacy TTI unicast PDSCH and short TTI unicast PDSCH simultaneously on one carrier Hereinafter, an operation of a user equipment for simultaneous transmission of an SRS and an sPUSCH and a scheduling method of a base station according to embodiments will be described.

Figure 14:
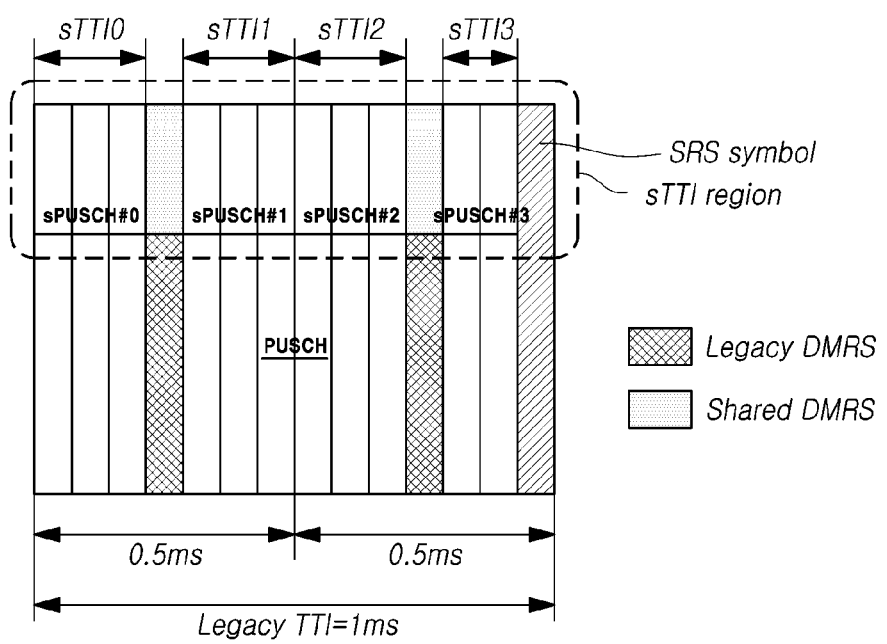
FIG. 14 is a diagram for illustrating concept of transmission of an sPUSCH and an SRS.
Figure 15:
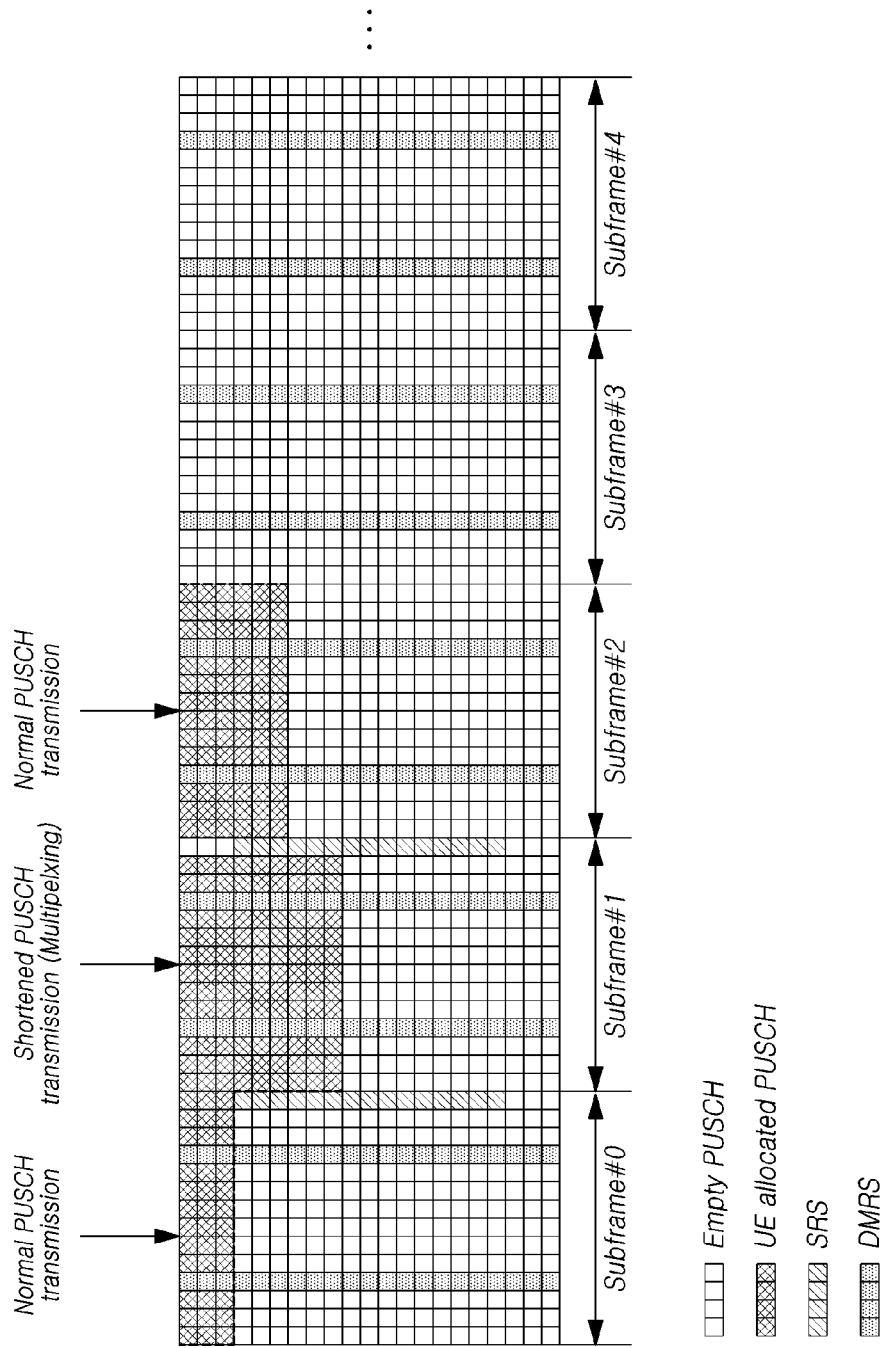
FIG. 15 is a diagram for illustrating concept of allocation of an SRS and a legacy PUSCH.

FIG. 14 is a conceptual diagram for illustrating transmission of an sPUSCH and an SRS, and FIG. 15 is a conceptual diagram for illustrating allocation of an SRS and a legacy PUSCH.

In FIG. 14, sPUSCH and SRS transmission may be illustrated. As shown in FIG. 14, the typical 1 SRS may be allocated to the last symbol of an uplink subframe. The following method is applied to the typical PUSCH and SRS in order to solve such a problem.

As shown in FIG. 15, an overlapping problem should be considered for allocation of a legacy PUSCH in a subframe configured for SRS transmission. That is, overlapping PUSCH and SRS should be avoid when allocating a PUSCH to a region having an SRS. In general, since it is preferential to protect the SRS first, the SRS has priority of transmission. Therefore, the PUSCH adjusts the information size through multiplexing. That is, when the PUSCH has symbols overlapping with a SRS, data transmission is performed only in a region excluding the overlapping symbols.

However, it is difficult to apply such an overlapping problem solution for the legacy PUSCH and SRS to the sPUSCH.

For example, when a sTTI is defined to have two symbol durations, there is only one DMRS transmission symbol duration remaining after excluding the SRS overlapping symbol duration from the sTTI. Accordingly, it is impossible to transmit data at the corresponding sTTI through the sPUSCH.

For another example, when a sTTI is defined to have three OFDM symbol durations, it is possible to transmit the sPUSCH through two symbol durations remaining after excluding one DMRS symbol duration. However, one of the two remaining symbol durations is for transmitting a SRS. Accordingly, there is only one symbol duration in the sTTI for transmitting the sPUSCH.

As described, it may be impossible to transmit data because of insufficient data resource elements (RE), and extremely small amount of data may be transmitted. Accordingly, there are defects in the latency reduction. Therefore, the present disclosure proposes the following method in order to solve the above described problems that may occur in the overlapping section of the sPUSCH and the SRS.

Scheme 2-1. When an sPUSCH Defined in the Last sTTI in a Subframe Overlaps with a SRS Resource, sPUSCH Transmission is Unconditionally Dropped. Alternatively, the sPUSCH Transmission is Skipped.

Figure 16:
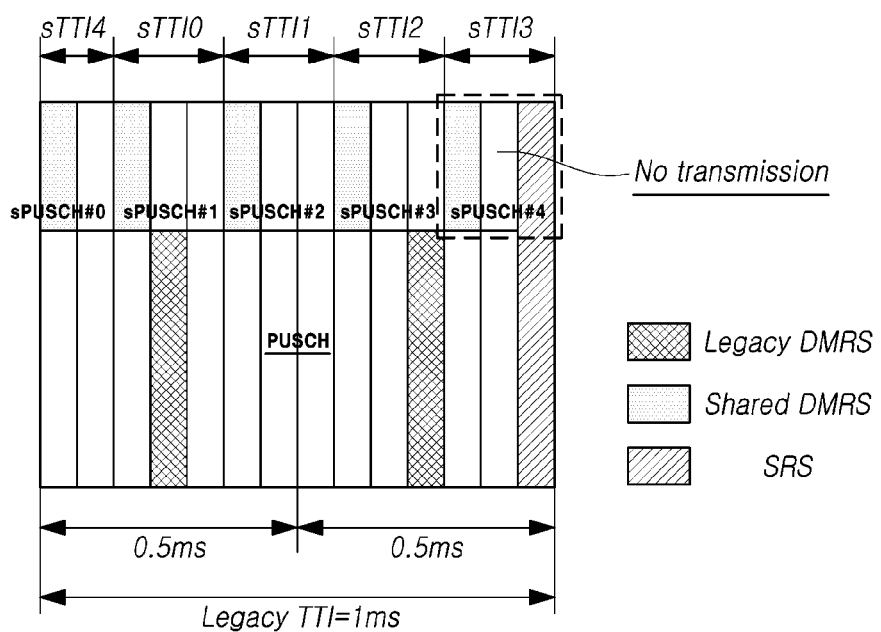
FIG. 16 is a diagram for illustrating concept of SRS protection through sPUSCH drop.

FIG. 16 is a conceptual diagram for illustrating SRS protection through sPUSCH drop.

When SRS transmission duration overlaps with a resource of an sPUSCH, transmission of the sPUSCH in a corresponding sTTI is skipped. In this case, it is assumed that the configuration for SRS transmission is predefined through RRC and SIB2, and the sTTI is configured in a semi-static manner. Although a user equipment is assigned sPUSCH transmission through the corresponding sTTI, the user equipment does not perform data transmission. In this case, the sPUSCH transmission in the sTTI may define operations of a user equipment through the following method.

① The user equipment performs transmission again in the same sTTI of the next subframe in which SRS transmission is not performed.

For example: the user equipment performs transmission again in the last sTTI #N (assuming SRS transmission in subframe#0)

Subframe#0(sTTI#0, sTTI#1, . . . , sTTI#N) subframe#1 (sTTI#0, sTTI#1, . . . , sTTI#N)

② The user equipment performs transmission again in the first sTTI of the next subframe in which the SRS transmission is not performed.

For example: the user equipment performs transmission again in the last sTTI #N (assuming SRS transmission in subframe#0)

Subframe#0(sTTI#0, sTTI#1, . . . , sTTI#N) subframe#1 (sTTI#0, sTTI#1, . . . , sTTI#N)

③ The user equipment deletes the corresponding sPUSCH data from a buffer and stands by for sPUSCH reallocation.

Scheme 2-2. When an sPUSCH Defined in the Last sTTI in a Subframe Overlaps with a SRS Resource, Shortened Data-Based sPUSCH Transmission is Performed.

When SRS transmission duration overlaps with a resource of an sPUSCH, transmission of the same shortened sPUSCH is performed in a corresponding sTTI. The method is applied in the same manner as the typical method used when an SRS and a legacy PUSCH overlap. Further, the user equipment also excludes an SRS overlap region when calculating the number of available REs. However, when available REs remaining after excluding SRS symbol duration in an sTTI region are too small to be used, sPUSCH transmission through a corresponding sTTI is skipped. Therefore, the sPUSCH transmission is determined in consideration of the following criterion.

① No. Of Available REs>$N_{Threshold}$

The user equipment performs sPUSCH transmission except for SRS symbol duration.

In this case, the information size is recalculated in consideration of available REs.

② No. of available REs≤$N_{threshold}$

The user equipment does not perform sPUSCH transmission.

Scheme 2-3. Although an sPUSCH Defined in the Last sTTI in a Subframe Overlaps with an SRS Resource, SPUSCH Transmission is Performed.

When SRS transmission duration overlaps with a resource of the sPUSCH, the sPUSCH performs transmission regardless of SRS configuration in a corresponding sTTI. Since interference may occur in an SRS symbol region, the sPUSCH transmission is performed according to the following guide.

① In a case where an sPUSCH and an SRS section of the same UE overlap with each other The user equipment skips its own SRS transmission and maps an sPUSCH in symbol duration to transmit the sPUSCH to all sTTIs.

In this case, since the base station is able to be recognize in advance that an SRS resource in a frequency region and an sPUSCH section overlap with each other even in the symbol duration in which an SRS section is configured, the base station performs sPUSCH detection without performing SRS detection in the corresponding region.

② In a case where sPUSCHs and SRS sections of different UEs overlap with each other The sPUSCH transmission is not performed since another user equipment is able to perform SRS transmission in an SRS configuration region.

If transmission has to be performed due to the importance of information through a corresponding sPUSCH, transmission is performed at low power in order to minimize interference in an SRS section.

Scheme 2-4. Performing an Adjacent sTTI is Bundled and Data Transmission when an sPUSCH Defined in the Last sTTI in a Subframe Overlaps with a SRS Resource.

Figure 17:
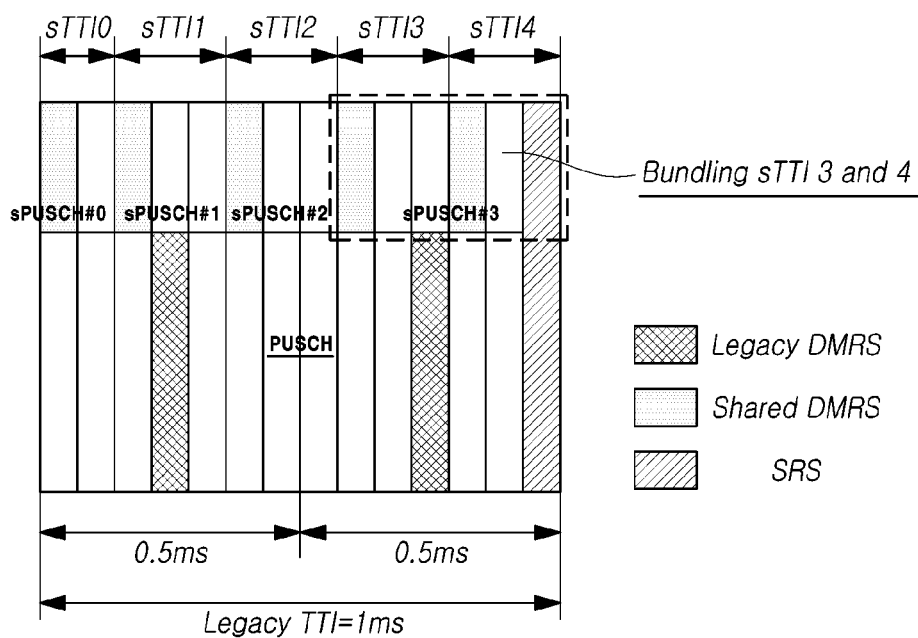
FIG. 17 is a diagram for illustrating concept of sTTI bundling.

FIG. 17 is a conceptual diagram for illustrating sTTI bundling.

In the scheme 2-4, when an sTTI overlaps with SRS symbol duration, and thus the number of available REs of the corresponding sTTI is less than a predetermined number, the sTTI may be unavailable for data transmission. Therefore, in this case, sPUSCH transmission is performed by basically performing bundling with an adjacent sTTI.

Since the base station has been aware of whether the SRS symbol is overlapped in advance, the user equipment performs sTTI bundling according to a predetermined pattern in performing the corresponding sTTI transmission and calculates an available RE again to perform data transmission.

For example, FIG. 17 illustrates an example of transmitting sPUSCH#3 by bundling sTTI#3 and #4. In this case, when the same user equipment is assigned continuous sTTIs and each of the sTTI includes a DMRS, the following operation may be additionally defined.

① The user equipment transmits the DMRS only in an sTTI preceding a target sTTI to be bundled and performs data transmission in all the symbols except for an SRS transmission symbol through an sPUSCH.

In this case, the base station has been aware of sTTI bundling-based transmission of the user equipment in advance and thus performs sPUSCH detection using only the DMRS of the preceding sTTI.

② The user equipment transmits the DMRS in all target sTTIs to be bundled and performs data transmission in all the symbols except for the SRS transmission symbol through the sPUSCH.

In this case, the base station has been aware of the bundled sTTI-bundling based transmission of the user equipment in advance and thus performs sPUSCH detection using all of DMRSs located in each sTTI.

Scheme 2-5. Defining sTTIs Excluding the Last Symbol of a Subframe where SRS Transmission is Performed in sTTI Configuration.

In the scheme 2-5, an sTTI is defined in a semi-static manner. That is, if a SRS is configured in a subframe, i) a SRS symbol duration is unconditionally excluded, and ii) the sTTI is defined in the corresponding subframe. In this case, the SRS overlap problem is prevented.

As described above, in the present disclosure, the methods for solving an overlap problem of an sTTI-based sPUSCH and SRS symbol duration are provided. Such methods may be applied to related signals and channels.

Figure 18:
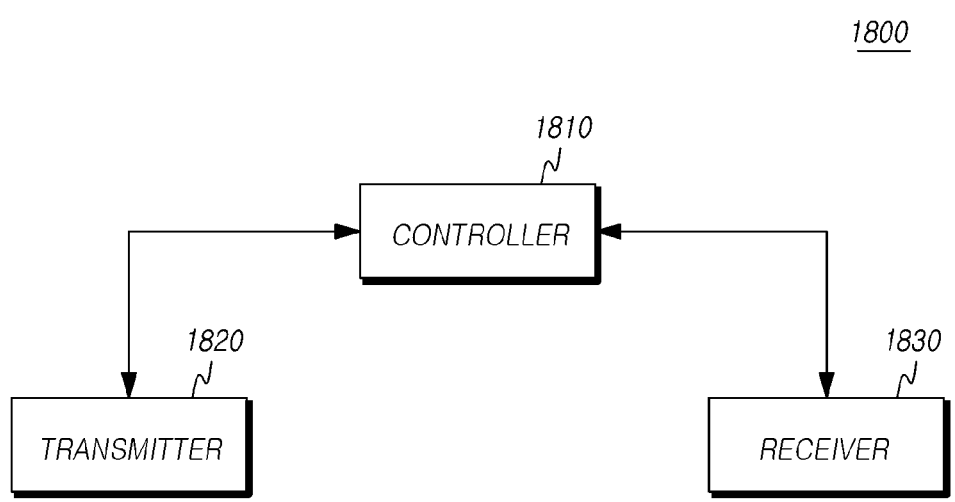
FIG. 18 is a diagram for illustrating a base station according to embodiments.

FIG. 18 illustrates a base station according to embodiments.

Referring to FIG. 18, the base station 1800 according to embodiments includes a controller 1810, a transmitter 1820, and a receiver 1830.

The controller 1810 controls overall operations of the base station 1800 according to the embodiments described above for search space configuration and blind decoding of an sPDCCH and a legacy PDCCH for a short TTI frame.

In addition, the controller 1810 controls overall operations of the base station 1800 according to the performance of sPUCCH configuration and transmission, and sPUSCH and SRS transmission according to them embodiments described above.

The transmitter 1820 and the receiver 1830 are used for transmitting or receiving a signal, a message, or data required for performing the aforementioned present disclosure to/from a user equipment.

Figure 19:
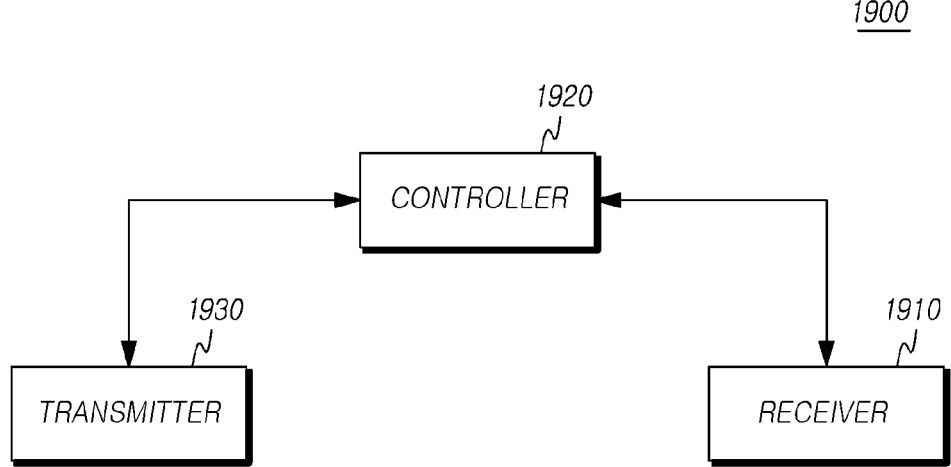
FIG. 19 is a diagram for illustrating a user equipment according to embodiments.

FIG. 19 illustrates a user user equipment according to present embodiments.

Referring to FIG. 19, the user user equipment 1900 according to the embodiments includes a receiver 1910, a controller 1920, and a transmitter 1930.

The receiver 1910 receives downlink control information, data, and a message from a base station through a corresponding channel.

The controller 1920 controls overall operations of the user user equipment 1900 according to the embodiments described above for search space configuration and blind decoding of an sPDCCH and a legacy PDCCH for a short TTI frame.

In addition, the controller 1920 controls overall operations of the user user equipment 1900 according to the performance of sPUSCH configuration and transmission, and sPUSCH and SRS transmission according to the aforementioned present embodiments.

The transmitter 1930 transmits uplink control information, data, and a message to the base station through a corresponding channel.

The standard details or standard documents mentioned in the above embodiments are omitted for the simplicity of the description of the specification, and constitute a part of the present specification. Therefore, when a part of the contents of the standard details and the standard documents is added to the present specifications or is disclosed in the claims, it should be construed as falling within the scope of the present disclosure.

APPENDIX

[1] Ericsson, Huawei, "New SI proposal Study on Latency reduction techniques for LTE", RP-150465, Shanghai, China, Mar. 9-12, 2015.

[2] R2-155008, "TR 36.881 v0.4.0 on Study on Latency reduction techniques for LTE", Ericsson (Rapporteur)

[3] R1-160927, "TR 36.881-v0.5.0 on Study on Latency reduction techniques for LTE", Ericsson (Rapporteur)

Although a preferred embodiment of the present disclosure has been described for illustrative purposes, those skilled in the art will appreciate that various modifications, additions and substitutions are possible, without departing from the scope and spirit of the disclosure as disclosed in the accompanying claims. Therefore, exemplary aspects of the present disclosure have not been described for limiting purposes. The scope of the present disclosure shall be construed on the basis of the accompanying claims in such a manner that all of the technical ideas included within the scope equivalent to the claims belong to the present disclosure.

The invention claimed is:

1. A method for a user equipment (UE), to receive a downlink channel and to transmit an uplink channel, the method comprising:

receiving information relating to an aggregation level of a UE-specific search space for a short physical downlink control channel (sPDCCH); receiving and decoding the sPDCCH based on the information relating to the aggregation level of the UE-specific search space;

receiving a short physical downlink data channel (sPDSCH) based on the received sPDCCH;

configuring a short physical uplink control channel (sPUCCH), the sPUCCH including Acknowledgement/Non-Acknowledgement (Ack/Nack), by allocating cyclic shift information for the Ack/Nack; and transmitting the sPUCCH including the Ack/Nack for the sPDSCH to a base station, wherein the sPDCCH, the sPDSCH and the sPUCCH are configured with a short transmission time interval, and wherein the sPDCCH is configured with the aggregation level of the UE-specific search space only without being configured with a common search space.

2. The method of claim 1, wherein the cyclic shift information, which comprises two cyclic shift values, and are allocated for the Ack/Nack, respectively.

3. A method for a base station, to transmit a downlink channel and to receive an uplink channel of a short transmission time interval, the method comprising:

transmitting information relating to an aggregation level of a user equipment (UE)- specific search space for a short physical downlink control channel (sPDCCH);

transmitting the sPDCCH based on the information relating to the aggregation level of the UE-specific search space;

transmitting a short physical downlink data channel (sPDSCH) based on the transmitted sPDCCH;

and receiving the sPUCCH including the Ack/Nack for the sPDSCH from a UE, wherein cyclic shift information is allocated for the Ack/Nack, wherein the sPDCCH, the sPDSCH and the sPUCCH are configured with a short transmission time interval, and wherein the sPDCCH is configured with the aggregation level of the UE-specific search space only without being configured with a common search space.

4. The method of claim 3, wherein the cyclic shift information, which comprises two cyclic shift values, and are allocated for the Ack/Nack, respectively.

5. A user equipment (UE) receiving a downlink channel and transmitting an uplink channel of a short transmission time interval, the UE comprising:

a receiver receiving information relating to an aggregation level of a UE-specific search space for a short physical downlink control channel (sPDCCH), receiving and decoding the sPDCCH based on the information relating to the aggregation level of the UE-specific search space, and receiving a short physical downlink data channel (sPDSCH) based on the received sPDCCH;

a controller configuring a short physical uplink control channel (sPUCCH), the sPUCCH including Acknowledgement/Non-Acknowledgement (Ack/Nack), by allocating cyclic shift information for the Ack/Nack; and a transmitter transmitting the sPUCCH including the Ack/Nack for the sPDSCH, wherein the sPDCCH, the sPDSCH and the sPUCCH are configured with a short transmission time interval, and wherein the sPDCCH is configured with the aggregation level of the UE-specific search space only without being configured with a common search space.

6. The user equipment of claim 5, wherein the cyclic shift information, which comprises two cyclic shift values, and are allocated to the Ack/Nack, respectively.

* * * * *